United States Patent [19]

Dettmers

[11] Patent Number: 4,907,779

[45] Date of Patent: Mar. 13, 1990

[54] ELECTRO-MAGNETICALLY OPERATED VALVE DEVICES

[75] Inventor: Michael Dettmers, Kamen, Fed. Rep. of Germany

[73] Assignee: Gewerkschaft Eisenhutte Westfalia GmbH, Fed. Rep. of Germany

[21] Appl. No.: 376,381

[22] Filed: Jul. 6, 1989

[30] Foreign Application Priority Data

Jul. 13, 1988 [DE] Fed. Rep. of Germany ....... 3823681

[51] Int. Cl.$^4$ ............................................. F16K 31/10
[52] U.S. Cl. ............................ 251/129.18; 251/129.2; 335/258
[58] Field of Search ........................ 251/129.18, 129.2; 335/258

[56] References Cited

U.S. PATENT DOCUMENTS 1,961,386 6/1934 Payne ............................ 251/129.2 X
3,143,131 8/1964 Spencer ......................... 251/129.2 X Primary Examiner—Arnold Rosenthal
Attorney, Agent, or Firm—Samuels, Gauthier, Stevens & Kehoe

[57] ABSTRACT

A valve device has a multi-part housing containing a servo-valve with a stem which is axially displaced to operate the valve and an electromagnet with a rod-like armature which is axially displaced when the electromagnet is energized. A pivotable lever translates the axial movement of the armature to the stem. For adjustment purpose, an adjustment member is in screw-threaded engagement with the lever remote from the stem. The armature is locked for rotation with the adjustment member. A regulator at the opposite end of the armature to the lever and accessible from the exterior serves to enable the armature to be partially rotated for effecting the adjustment.

12 Claims, 1 Drawing Sheet

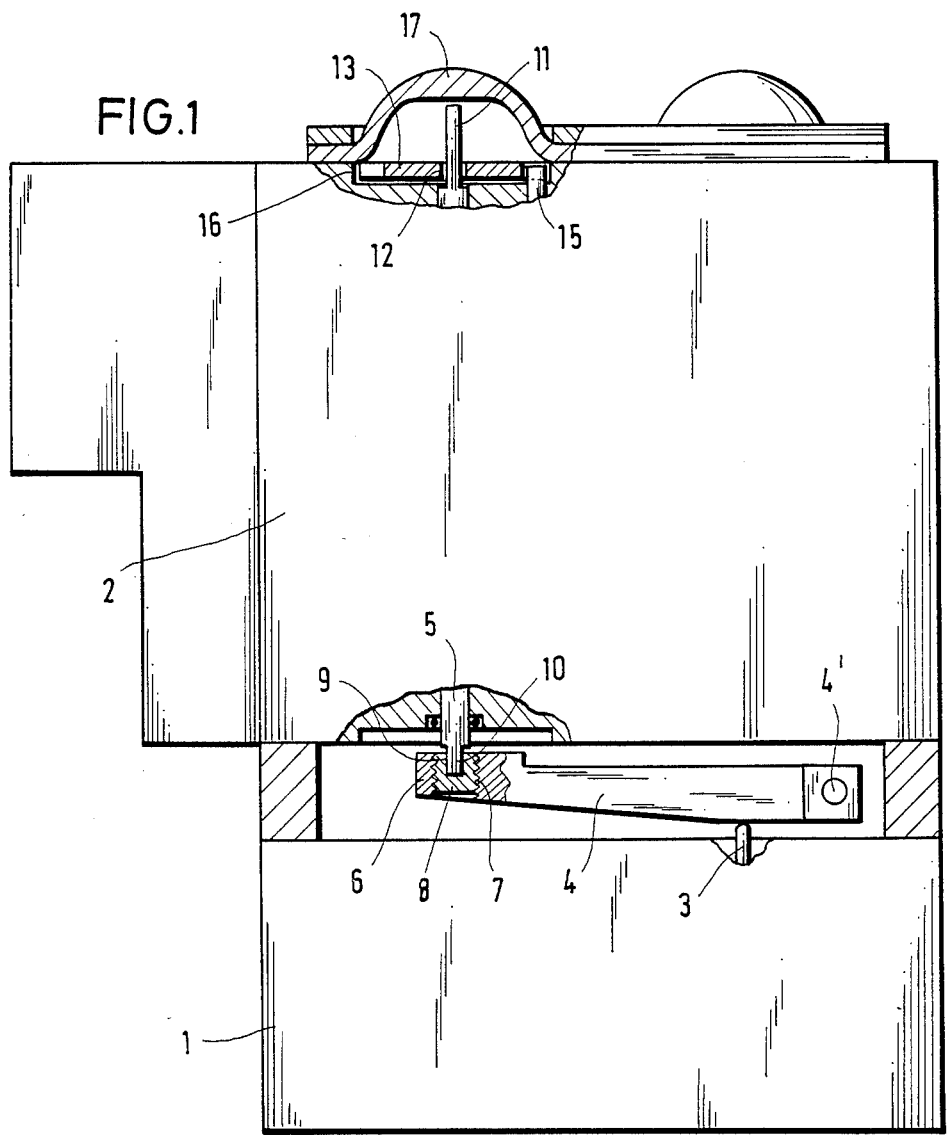

ELECTRO-MAGNETICALLY OPERATED VALVE DEVICES

FIELD OF THE INVENTION

The present invention relates to electro-magnetically operated valve deices, particularly hydraulic servo-valves for use in mining equipment.

BACKGROUND TO THE INVENTION

Electro-magnetic or solenoid valve devices are widely used for the control of mining equipment. Usually such devices are housed in rectangular components assembled to one another to form valve units or blocks. It is known to construct such devices so that their respective electromagnet displaces a pivotable lever which in turn axially moves a stem of the valve to change the state of the valve i.e. to open or close the valve. It is necessary with such a construction to adapt the stroke of the armature of the electromagnet as accurately as possible to conform to the stroke of the valve stem taking into account the lever ratio. Some controlled adjustment is however necessary and to achieve this hitherto simple screws and lock nuts have been provided on the actuator levers. Openings are then provided in the housings of the valve devices to permit access to the adjustment screws for the adjustment to be effected. Where the housings of several valve devices are combined as a unit or block it is frequently difficult to have ready access to all the individual adjustment mechanisms. Moreover even if ready access is possible fine adjustments have been difficult to effect in practice.

A general object of the invention is to provide an improved adjustment mechanism for a valve device such that fine, sensitive adjustment is feasible and access is permitted for such adjustment even when valve devices are assembled as a block.

SUMMARY OF THE INVENTION

In accordance with the invention, an adjustment mechanism for an electromagnetic valve device incorporates the armature of the electromagnet itself. The armature is prolonged and rotatably locked to an adjustment member in screw-threaded engagement with the pivotable actuating lever. The opposite end of the armature is also prolonged and made accessible from the exterior of the housing of the device. Conveniently, the access is via an upper face of the housing which is normally free even when a number of valve devices are combined. Thus, accessibility is preserved at all times even if a number of valve devices are assembled together.

To further facilitate the adjustment, a regulator, such as a disc, which can be turned by hand can be fitted to the end portion of the armature remote from the lever. The regulator can seat in a recess in the housing. Preferably, the armature has flattened or rectangular end portions fitting into slots in the regulator and the adjustment member. This enables the armature to move freely in an axial sense when the electromagnet is energized while locking the regulator through the armature to the adjustment member for rotational adjustment.

It is advisable to have indexing means on the regulator to facilitate fine control. Locking means, e.g. a cam or pin, can engage with the indexing means to lock the regulator in a set position. Conveniently, the regulator can be lifted axially of the armature to free the locking means and allow adjustment. A removable cap fitted to the housing can cover and protect the regulator and the adjacent end portion of the armature.

An electro-magnetically operated valve device constructed in accordance with the invention can comprise a housing containing a valve with an actuator stem, an electro-magnet with an axially displaceable rod-like armature, a pivotable actuating lever displaced by the armature to move the actuator stem axially, and an adjustment mechanism composed of an adjustment member in screw-threaded engagement with the lever, the armature being locked for rotation with the adjustment member with an end of the armature remote from the lever being accessible for rotational adjustment.

The invention may be understood more readily and various other aspects and features of the invention may become apparent from consideration of the following description.

BRIEF DESCRIPTION OF DRAWINGS

An embodiment of the invention will now be described by way of example only, with reference to the accompanying drawing wherein:-

FIG. 1 is a part-sectional side view of a valve device incorporating an adjustment mechanism in accordance with the invention; and FIG. 2 is a plan view of part of the adjustment mechanism.

DESCRIPTION OF PREFERRED EMBODIMENT

As shown in FIG. 1, a valve device takes the form of a solenoid valve device of generally rectangular or plate shaped configuration. The device is assembled from two individual component parts 1, 2. The component part 1 houses at least one valve preferably a hydraulic servo valve with a stem 3 or the like serving to actuate the valve. Conveniently the valve is fitted into a boring in the component part 1. The complementary component part 2 houses at least one electro-magnetic actuator which has an armature which is operably coupled to a lever 4 which is pivotably supported by a bearing 4'. The armature takes the form of a shaft or pin 5 extending through the component part 2. When the electromagnet is energized the pin 5 moves the lever 4 about the pivot bearing 4' to displace the stem 3 and operate the valve. The lever 4 has a threaded bore 7 near its free end 6 into which a screw-threaded member 8 is engaged. The bore 7 and the member 8 mate with a fine screw thread e.g. with a pitch of 0.5 mm. The member 8 has a slot 9 which receives a rectangularly shaped end portion 10 of the pin 5. The engagement between the portion 10 and the slot 9 permits relative axial displacement but resists relative rotation.

Hence rotation of the pin 5 will result in the member 8 moving in or out of the bore 7. The end of pin 5 opposite the lever 4 projects outwardly from the component part 2 as at 11. This end portion 11 is accessible from the exterior of the valve device to permit adjustment of the member 8. Conveniently the end portion 11 of the pin 5 is again of rectangular configuration and engages into a slot 12 of a disc-shaped regulator 13. Again, the pin 5 is rotational locked to the regulator but free for axial displacement. By partly rotating the regulator 13 through a set angle the screw-threaded member 8 can be adjusted and set through the pin 5. The regulator 13 seats in a recess 16 in the upper face of the component part 2 and axial displacement of the pin 5 in response to energization of the electromagnet will not affect the position of the regulator 13.

As shown in FIG. 2, the regulator 13 has equi-spaced recesses 14 around its periphery to act as an indexing means. A locking pin 15 is fitted in the recess 16 in the component part 2 to engage into one of the recesses 14. The regulator 13 is covered by a removable cap 17 mounted to the upper face of the component part 2. When the cap 17 is removed the regulator 13 can be slidably lifted along the end portion 11 of the pin 5 to free the regulator 13 from the locking pin 15. The regulator 13 can then be partly rotated by hand to cause the pin 5 to partly rotate and adjust the member 8. Once the adjustment has been effected the regulator 13 is lowered to bring the pin 15 into another recess 14 to hold the set position. By virtue of the fine screw thread between the member 8 and the bore 7 which is effectively subdivided by the indexing recesses 14 a very sensitive adjustment is achieved. Once set the cap 17 is replaced.

It is possible for the device to house two servo valves each having its own separate electromagnetic and adjustment mechanism. As is known a number of devices may be assembled together side-by-side as a block or unit.

Modifications are feasible within the scope the invention. For example, the disc regulator 13 could be replaced by a lever, the locking means can be a cam and/or the indexing means 14 can take the form of teeth or a set of pins.

I claim:

1. An electro-magnetically operated valve device comprising a housing containing a valve with an actuator stem, an electro-magnet with an axially displaceable rod-like armature, a pivotable actuating lever displaced by the armature to move the actuator stem axially, and an adjustment mechanism composed of an adjustment member in screw-threaded engagement with the lever, the armature being locked for rotation with the adjustment member with an end of the armature remote from the lever being accessible for rotational adjustment.

2. A valve device according to claim 1, wherein a regulator is provided on the end of the armature remote from the lever to facilitate the adjustment.

3. A valve device according to claim 2, wherein the regulator is a disc freely displaceable axially of the armature but locked for rotation with the armature.

4. A valve device according to claim 3, wherein the disc has indexing means on its periphery which selectively interengages with locking means.

5. A valve device according to claim 4, wherein the indexing means takes the form of regular openings in the disc and the locking means is a pin fitted to the housing.

6. A valve device according to claim 3, wherein the disc seats in a recess in the housing.

7. A valve device according to claim 1, wherein the armature has an end portion which engages in an opening in the adjustment member.

8. A valve device according to claim 3, wherein the armature has an end portion which engages in a opening in the disc.

9. A valve device according to claim 7, wherein the opening is a slot and the armature end portion is rectangular.

10. A valve device-according to claim 8, wherein the opening is a slot and the armature end portion is rectangular.

11. A valve device according to claim 2, and further comprising a detachable cap fitted to the housing to cover the regulator.

12. A valve device according to claim 1, wherein the housing is composed of two component parts assembled together one part housing the valve and the other part housing the electromagnet.

* * * * *